Figure 1:
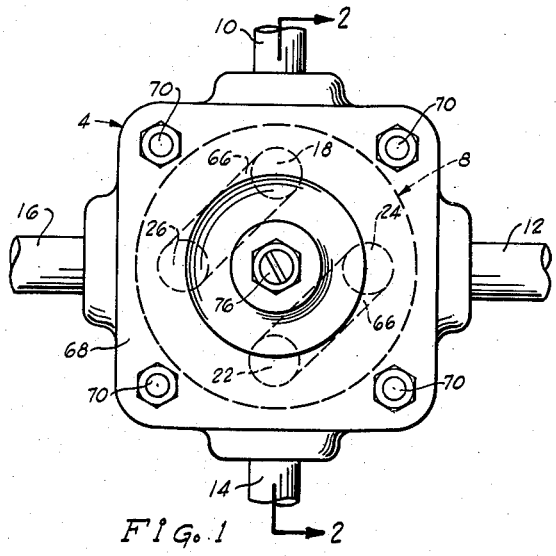

July 4, 1961

C. L. SHARP 2,990,853

ROTARY VALVE

Filed Jan. 23, 1958

INVENTOR.
CHESTER L. SHARP
BY
Jerry J. Dunlap
ATTORNEY

United States Patent Office 2,990,853
Patented July 4, 1961

2,990,853
ROTARY VALVE
Chester L. Sharp, Tulsa, Okla., assignor, by mesne assignments, to National Tank Company, Tulsa, Okla., a corporation of Nevada
Filed Jan. 23, 1958, Ser. No. 710,693
3 Claims. (Cl. 137—625.42)

This invention relates generally to improvements in valves, and more particularly, to rotary valves.

As it is well known in the art, rotary valves are most commonly used as four-way valves comprising a valve body having four separate fluid passageways therethrough and a rotatable plate or plug having ports therein to control the flow between the various passageways in the body. In present day commercial four-way valve constructions, the rotary member is supported in a fixed longitudinal position and is exposed to high pressure fluid on only one side or end thereof. As a result, the rotary member is forced against its supporting surfaces, and, if complicated thrust bearing assemblies are not used, the rotary member is difficult to turn. In extremely high pressure service, motors are frequently required to turn the rotary members.

Many attempts have been made to reduce the unbalanced pressure condition of such plugs and valve plates. Heretofore, however, such valves have been unduly complicated and too expensive for commercial use. For example, one balanced valve which has been proposed utilizes additional counter-bored ports through the valve plate (in addition to the ports in the valve plate required to control the flow of fluid through the body passageways) in combination with plugs slidingly disposed in the counter-bores and urged toward the valve plate by springs to overcome the pressure force imposed on the valve plate by the high pressure inlet fluid.

The present invention contemplates a novel rotary valve wherein the valve plate is both slidingly and rotatably supported in a chamber adjacent the ports in the valve body. A minor amount of the high pressure inlet fluid is directed into the chamber to act on the end of the valve plate opposite the ports in the valve body, such that the valve plate is constantly urged toward the valve body with a force at least as great as the pressure force imposed on the valve plate through the high pressure inlet port. The axial sliding movement of the valve plate is limited to such an extent that an insignificant amount of fluid will leak around the valve plate, yet the amount of fluid is sufficient to control the turning resistance of the valve plate. This invention also contemplates the use of a by-pass passageway for directing high pressure inlet fluid into the chamber containing the valve plate, such that the valve may be used in substantially any type of fluid service.

An important object of this invention is to provide a simply constructed rotary valve which will have a minimum turning resistance.

Another object of this invention is to provide a rotary valve wherein the pressure of the inlet fluid on the rotary member will be counter-balanced by a fluid pressure force on the opposite end of the rotary member.

A further object of this invention is to provide a rotary valve wherein the rotary member is supported in such a manner that it may be moved axially in response to fluid pressure differentials thereacross to minimize the turning resistance of the rotary member.

A still further object of this invention is to provide a pressure balance on the rotary member of a rotary valve by using the minimum number of parts or elements in the valve construction, and to provide a pressure balanced rotary valve which may be economically manufactured.

Other objects and advantages of the invention will be evident from the following detailed description, when read in conjunction with the accompanying drawings which illustrate my invention.

Figure 2:
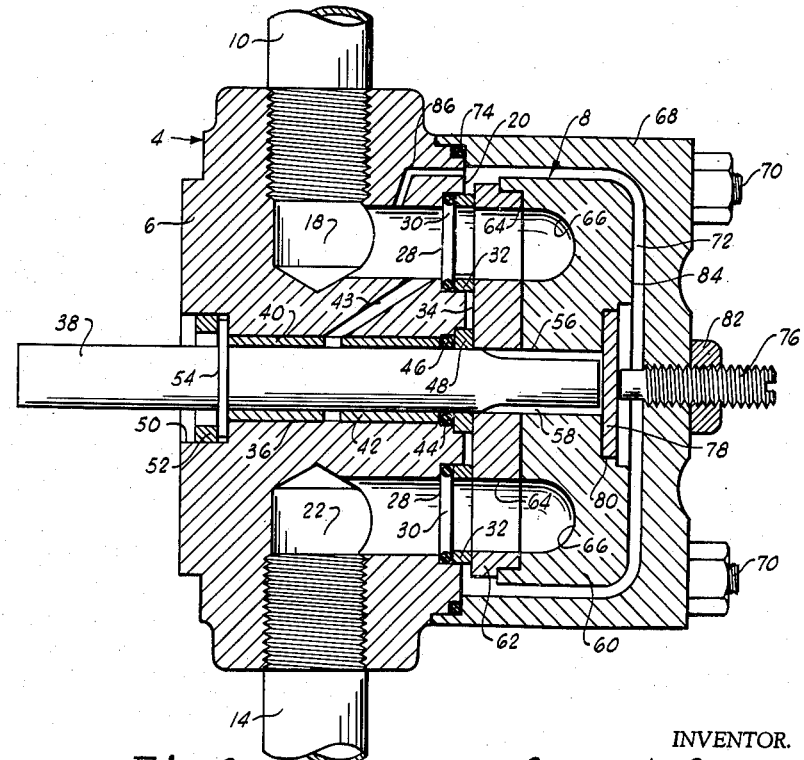

In the drawings:
FIGURE 1 is an end elevational view of a rotary valve constructed in accordance with this invention.
FIGURE 2 is an enlarged sectional view as taken substantially along lines 2—2 of FIG. 1.

Referring to the drawings in detail, reference character 4 generally designates a four-way rotary valve comprising a valve body 6 and a rotary member, or valve plate, generally designated by reference character 8. The valve body 6 has four conduits 10, 12, 14 and 16 secured thereto. For purposes of explanation, it will be assumed that the conduit 10 communicates with a source of high pressure fluid, the conduits 12 and 16 communicate with some device (not shown) being controlled by the valve 4, and the conduit 14 communicates with an exhaust. Each of the conduits 10 through 16 is suitably secured to the valve body 6, as by being threaded into the valve body as illustrated by the conduits 10 and 14 in FIG. 2.

The inlet conduit 10 communicates with an L-shaped port 18 extending from the upper end of the body 6 into communication with an end face 20 of the body 6. The exhaust conduit 14 communicates with another L-shaped port 22 extending from the lower end of the body 6 to the end face 20 in opposed relation to the port 18. The conduits 12 and 16 communicate with opposed, similarly shaped ports, 24 and 26, respectively, as illustrated by the dotted lines in FIG. 1. The end face 20 of the body 6 is preferably flat and the ends of the ports 18, 22, 24 and 26 which communicate with the end face 20 are arranged in circumferentially spaced relation (preferably about ninety degrees apart) around the longitudinal axis of the body 6.

Each port in the body 6 is provided with a counterbore 28 in the inner end thereof in communication with the end face 20 to receive a suitable sealing ring 30 having elastic properties, and valve seat 32. Each sealing ring 30 is positioned in the inner end of the respective counter-bore 28, and each valve seat 32 is of a size to slidingly fit in the respective counter-bore 28 outwardly of the respective sealing ring 30. The valve seats 32 are annular-shaped and normally project beyond the end face 20 to contact the inner face 34 of the rotary member 8, as will be more fully hereinafter set forth.

A bore 36 extends transversely through the center of the valve body 6 concentrically with respect to the ports 18, 22, 24 and 26 to receive a control shaft 38. The shaft 38 is supported by a pair of bushings 40 and 42 press fitted into the bore 36 to facilitate free rotation of the shaft 38. The bushings 40 and 42 are preferably spaced apart to facilitate lubrication of the shaft 38 through a passageway 43 leading from the high pressure port 18. A double counter-bore 44 is formed concentrically around the bore 36 in communication with the end face 20 to receive a sealing ring 46 and annular shaped bearing 48. The opposite end of the bore 36 is provided with an enlarged counterbore 50 to receive a locking ring 52. The locking ring 52 retains a flange 54, extending outwardly from the shaft 38, against the inner end of the counter-bore 50. The flange 54 extends circumferentially around the shaft 38 and may take the form of a washer welded or otherwise rigidly secured around the shaft 38, such that the shaft 38 will be rotatably supported in the body 6, but will be prevented from lengthwise movement in the body so long as the locking ring 52 engages the flange 54.

The shaft 38 extends all the way through the body 6 to beyond the end face 20 for supporting the rotary member 8 adjacent the end face 20. The rotary member 8 is provided with a bore 56 through the center thereof to receive the shaft 38, and cooperating splines 58 are formed on the outer periphery of the shaft 38 and in the bore 56, such that the rotary member 8 will be turned simultaneously with the shaft 38, yet the rotary member 8 may be slid lengthwise on the shaft 38.

The rotary member 8 is preferably in the form of a circular, flat plate, and formed in two sections, 60 and 62, pressed together to form a unitary structure. The section 62 of the rotary member 8 is provided with four ports 64 therein arranged to mate with the valve seats 32 in the alternate operating positions of the member 8. Each port 64 communicates with the end of a passageway 66 extending through a portion of the section 60 of the member 8. As best illustrated in FIG. 1, two of the passageways 66 are provided in the member 8, and each passageway 66 communicates with a port 64 at each end thereof to control the flow of fluid between the ports 18, 22, 24 and 26 of the valve body 6. More specifically, the uppermost passageway 66 provides a flow of fluid from the inlet port 18 to either of the operating ports 24 or 26, and the lower passageway 66 provides a flow of fluid from either the operating port 24 or the operating port 26 to the exhaust port 22, depending upon the position of the rotary member 8.

A cover 68 is secured to the valve body 6 by bolts 70 to provide a chamber 72 around the rotary member 8 and the end face 20 of the valve body 6. I prefer to provide a sealing ring 74 between the end of the cover 68 and the valve body 6 to assure that the chamber 72 will be sealed off and no leakage will occur between the cover 68 and the valve body. The chamber 72 is preferably of cylindrical configuration, and is of a size to provide a clearance around the rotary member 8, including sufficient clearance for the rotary member 8 to be moved axially a short distance on the shaft 38. An adjusting screw 76 is threaded through the closed end of the cover 68 to contact a plate 78 positioned in a counter-bore 80 formed in the end of the rotary member 8 concentrically around the bore 56. The adjusting screw 76, in combination with the plate 78, limits the axial movement of the rotary member 8 away from the end face 20 of the body 6, as will be more fully hereinafter set forth. If desired, a locking nut 82 may be threaded onto the screw 76 against the outer end of the cover 68 to lock the adjusting screw 76 in the desired position.

*Operation*

Before introducing high pressure fluid into the inlet port 18, the adjusting screw 76 is threaded into the cover 68 against the plate 78 to force the rotary member 8 against the valve seats 32. The rotary member 8 is adjusted to such a position that the seats 32 slightly compress the sealing rings 30 against the inner ends of the respective counter-bores 28.

High pressure inlet fluid is then directed through the port 18 and the respective seat 32 against a portion of the end face 34 of the rotary member 8, or against the walls of the upper passageway 66, depending upon the position of the rotary member 8. In either position of the rotary member 8, a minor portion of the high pressure fluid will leak between the outer end of the seat 32 of the port 18 and the adjacent portion of the rotary member end 34 into the chamber 72 around the member 8. Although a portion of the fluid in the chamber 72 will leak through the seat 32 of the low pressure port 22, the fluid pressure in the chamber 72 will be above exhaust pressure. This increased pressure in the chamber 72 acts across the entire end face 84 of the member 8, and across the exposed portions of the end face 34, i.e., across the end face 34 minus the areas covered by the seats 32 and bearing 48. Thus, the force imposed on the rotary member 8 by the fluid in the chamber 72 will provide a net force in a direction toward the valve body end face 20. However, this net force will be opposed by the pressure of fluid in each of the valve seats 32, such that, normally, the forces on the rotary member 8 are substantially balanced.

If the pressure in the chamber 72 increases to provide a resulting force toward the valve body end face 20, the rotary member 8 slides along the shaft 38 to further compress the sealing rings 30 and provide a more effective seal of the valve seats 32 against the inner face 34 of the member 8. As a result, the input of high pressure fluid into the chamber 72 will be reduced, and the pressure in the chamber 72 will gradually decline to a value such that the forces on the member 8 will tend to equalize. With varying pressure conditions, the rotary member 8 slides on the shaft 38 to increase or reduce the leakage through the valve seats 32, such that the member 8 is maintained substantially balanced and easy to turn.

The sealing rings 30 perform a dual function. Firstly, they prevent leakage from or into the ports in the valve body 6 around the outer peripheries of the valve seats 32. Thus any leakage around a valve seat 32 is between the outer end of the valve seat and the end face 34 of the rotary member 8, and such leakage is controlled by the axial or longitudinal position of the member 8. Secondly, the sealing rings 30 function as elastic members to bias the seats 32 outwardly into contact with the member 8, and hence tend to minimize leakage of fluid into and out of the chamber 72. This leakage will ordinarily be negligible when compared with the total flow through the valve 4, yet is sufficient to control the pressure balance of the rotary member 8.

As previously indicated, the valve 4 controls the flow of fluid to and from the conduits 12 and 16 by the proper positioning of the rotary member 8. In the position of the member 8 as shown in the drawings, high pressure fluid from the inlet conduit 10 is directed through the high pressure port 18, the respective seat 32 and into the uppermost port 64 of the rotary member 8. This high pressure fluid is then directed through the respective passageway 66 to the port 64 at the opposite end thereof and then into the port 26 associated with the conduit 16. Simultaneously, fluid from the conduit 12 is directed through the respective port 24 into the lower passageway 66 of the rotary member 8. This exhausting fluid is then directed into the exhaust port 22 and the outlet conduit 14. Rotation of the member 8 ninety degrees clockwise from the position indicated in FIG. 1 provides a flow of high pressure fluid from inlet conduit 10 to the conduit 12 and an exhaust of fluid from the conduit 16 to the outlet conduit 14.

In all operating positions of the valve 4, a portion of the high pressure fluid is directed through the passageway 43 to lubricate the shaft 38 in the bushings 40 and 42. It will be understood, of course, that such a lubricating passageway is provided from the high pressure port 18 only when the fluid being controlled by the valve 4 is suitable for lubricating the shaft 38. If the fluid being handled is not a suitable lubricant, the passageway 43 should be extended (not shown) to an exposed part of the valve body 6 and provided with a lubrication fitting to maintain the shaft 38 easily rotatable in the bushings 40 and 42.

It may also be noted that the sealing ring 46 prevents leakage of fluid from the chamber 72 along the shaft 38. The bearing 48 is preferably of a size to slide in the counter-bore 44, in the same manner as the valve seats 32, to compress the sealing ring 46 and provide a bearing support for the rotary member 8 without interfering with the operation of the valve seats 32.

The structure thus far described provides an efficient balance of forces on the rotary member 8 in a great variety of fluid environments, such that the force required to be imposed on the shaft 38 for turning the rotary member 8 is extremely small. In some fluid environments, however, it is desirable that an additional supply of high pressure fluid be directed into the chamber 72 to facilitate the seating of the rotary member 8 on the valve seats 32. I therefore prefer to provide a by-pass passageway 86 in the body 6 between an intermediate portion of the high pressure port 18 and the end face 20 of the body 6 around the valve seat 32 associated with the high pressure port. This by-pass passageway 86 provides direct communication for high pressure fluid from the high pressure port 18 to the chamber 72 to assure a constant supply of high pressure fluid in the chamber 72. The passageway 86 is, of course, substantially smaller in diameter than the high pressure port 18 and need be only of a size to assure that any fluid leaking from the chamber 72 will be immediately replaced.

Either with or without a by-pass passageway 86, the rotary member 8 will normally move axially on the shaft 38 during operation of the valve 4. However, and as previously noted, the adjusting screw 76 limits the movement of the member 8 away from the end face 20, such that a negligible amount of fluid will leak from the chamber 72 into the exhaust port 22. The adjusting screw 76 may be positioned in the cover 68 to vary the minimum compression of the sealing rings 30 and the maximum movement of the rotary member 8 for the fluid environment encountered.

From the foregoing it will be apparent that the present invention provides a simply constructed rotary valve which may be economically manufactured. The rotary member of the valve is pressure balanced, such that it may be turned with a minimum force. The pressure balance of the rotary member is obtained without the use of pressure plugs, springs, or the like. The rotary member is slidingly secured on the operating shaft and leakage of fluid between the high pressure and exhaust ports is induced, yet the leakage will be negligible.

Changes may be made in the combination and arrangement of parts or elements as heretofore set forth in the specification and shown in the drawings, it being understood that changes may be made in the precise embodiment shown without departing from the spirit and scope of the invention as defined in the following claims.

I claim:

1. A rotary valve for controlling the flow of fluids, comprising, a body having a substantially flat end face and a plurality of ports therethrough terminating in circumferentially spaced relation in said end face, a source of pressure fluid connected to one of the ports, a shaft rotatably secured in the body and protruding from said end face concentrically with respect to said terminal ends of said ports, a valve plate splined on said shaft adjacent said end face for turning movement with said shaft and for sliding movement on said shaft toward and away from said end face in response to pressure differentials across the opposite ends thereof, said valve plate having a plurality of passageways therein arranged to mate with said ports in selected positions of said shaft, a hollow housing secured to said body over said valve plate and sealed around said end face to form a chamber around said valve plate, the terminal end of each of said ports being counterbored, an annular valve seat slidingly fitting in each of said counterbores, an elastic material sealing ring in the inner end of each of said counterbores providing a seal between the outer periphery of the respective valve seat and the walls of the respective counterbore, each of said sealing rings being of a size to extend the respective valve seat into said chamber for sliding contact with the valve plate, and a stop carried by said housing for engaging the end of the valve plate opposite said end face and limiting the sliding movement of the valve plate away from said end face under the pressure from the fluid source to give the relative position to the valve plate and valve seats which will provide leakage of pressure fluid into and out of said chamber between said valve seats and the valve plate for balancing the pressure of the fluid across the opposite ends of the valve plate.

2. A rotary valve as defined in claim 1 wherein said stop comprises a screw threaded through said housing in a position for adjustment toward and away from said end face.

3. A rotary valve as defined in claim 1 wherein said body has a bypass passageway therein extending from said end face to said one port between the source of fluid pressure and terminal end of the port and said passageway having a diameter substantially less than any of said ports to flow additional fluid into said chamber for pressure balancing the valve plate.

References Cited in the file of this patent

UNITED STATES PATENTS

| 533,388 | Bolthoff | Jan. 29, 1895 |
| 905,605 | Tarn | Dec. 1, 1908 |
| 2,420,972 | Perri | May 20, 1947 |
| 2,696,219 | Barksdale | Dec. 7, 1954 |
| 2,744,540 | Erle | May 8, 1956 |
| 2,745,434 | Stevenson | May 15, 1956 |
| 2,827,924 | Towler et al. | Mar. 25, 1958 |

FOREIGN PATENTS

| 581,814 | Great Britain | Oct. 25, 1946 |